United States Patent [19]
Wells

[11] Patent Number: 5,653,392
[45] Date of Patent: Aug. 5, 1997

[54] WATER SPRAY APPARATUS

[76] Inventor: Joseph H. Wells, 5960 Black Rd., Cable, Ohio 43008

[21] Appl. No.: 556,006

[22] Filed: Nov. 13, 1995

[51] Int. Cl.⁶ .................................................. B08B 3/00
[52] U.S. Cl. ........................ 239/722; 239/754; 239/588
[58] Field of Search .................................. 239/722, 754, 239/273, 280, 289, 532, 565, 566, 550, 588, 557, 587, DIG. 6; 134/102.1; 15/320

[56] References Cited

U.S. PATENT DOCUMENTS

| 964,178 | 7/1910 | Opitz et al. | 239/754 |
|---|---|---|---|
| 2,889,994 | 6/1959 | French | 239/754 |
| 3,508,709 | 4/1970 | Small et al. | 239/287 |
| 3,770,210 | 11/1973 | Veltkamp | 239/532 |
| 4,022,382 | 5/1977 | Engdahl, Jr. | 239/557 |
| 4,083,495 | 4/1978 | Sharp | 239/287 |
| 4,580,726 | 4/1986 | Unger | 239/286 |
| 4,984,746 | 1/1991 | Joyal | 239/722 |

FOREIGN PATENT DOCUMENTS

| 586848 | 6/1934 | Germany | 239/722 |
|---|---|---|---|
| 645790 | 6/1937 | Germany | 239/722 |
| 670074 | 1/1939 | Germany | 239/722 |
| 733547 | 3/1943 | Germany | 239/732 |
| 2834596 | 2/1980 | Germany | 239/702 |
| 1377380 | 12/1974 | United Kingdom | 239/722 |

*Primary Examiner*—Andres Kashnikow
*Assistant Examiner*—Lisa Ann Douglas
*Attorney, Agent, or Firm*—Biebel & French

[57] ABSTRACT

A water spray apparatus for dual function use in washing motor vehicle undercarriages or in cleaning ground surfaces. The apparatus has a hollow cross tube axially supported by a pair of wheels and pivotally connected to a union. The cross tube has a row of commonly facing orifices for generating a row of commonly directed water streams. Directional reversal of the water streams is accomplished by pivoting rotation of the cross tube.

10 Claims, 9 Drawing Sheets

FIG-5

FIG-9 a
WATER SPRAY APPARATUS

BACKGROUND OF THE INVENTION

This invention relates to a water spray apparatus suitable for use in washing the undercarriages of automobiles, tracks and the like. Typical prior art devices of that type are shown in Unger, U.S. Pat. No. 4,580,726 and in Joyal, U.S. Pat. No. 4,984,746. The invention also relates to a water spray apparatus suitable for use in cleaning and sweeping walks, driveways, patios and the like. A typical prior art device for that purpose is shown in Sharp, U.S. Pat. No. 4,083,495. The Unger and Joyal references generate a row of upwardly directed water streams, whereas the Sharp reference generates a row of downwardly directed water streams. The present invention is able to do either.

SUMMARY OF THE INVENTION

This invention provides a dual purpose water sprayer by arranging a series of orifices along a line extending the length of a hollow cross tube which is axially supported by a pair of wheels. The cross tube is pivotally engaged by a union having a rotatable connection to a water supply assembly. Pivoting movement of the cross tube inverts the line of orifices so that they may selectively generate streams of water which are either upwardly directed or downwardly directed.

The water spray apparatus of this invention also has optional connection means for receiving a supply of pressurized air from a suitable pump and a flow of water from a garden hose or the like. This provides pressurized cleaning streams for scrubbing heavily soiled surfaces.

DESCRIPTION OF THE PREFERRED EMBODIMENT

Figure 1:
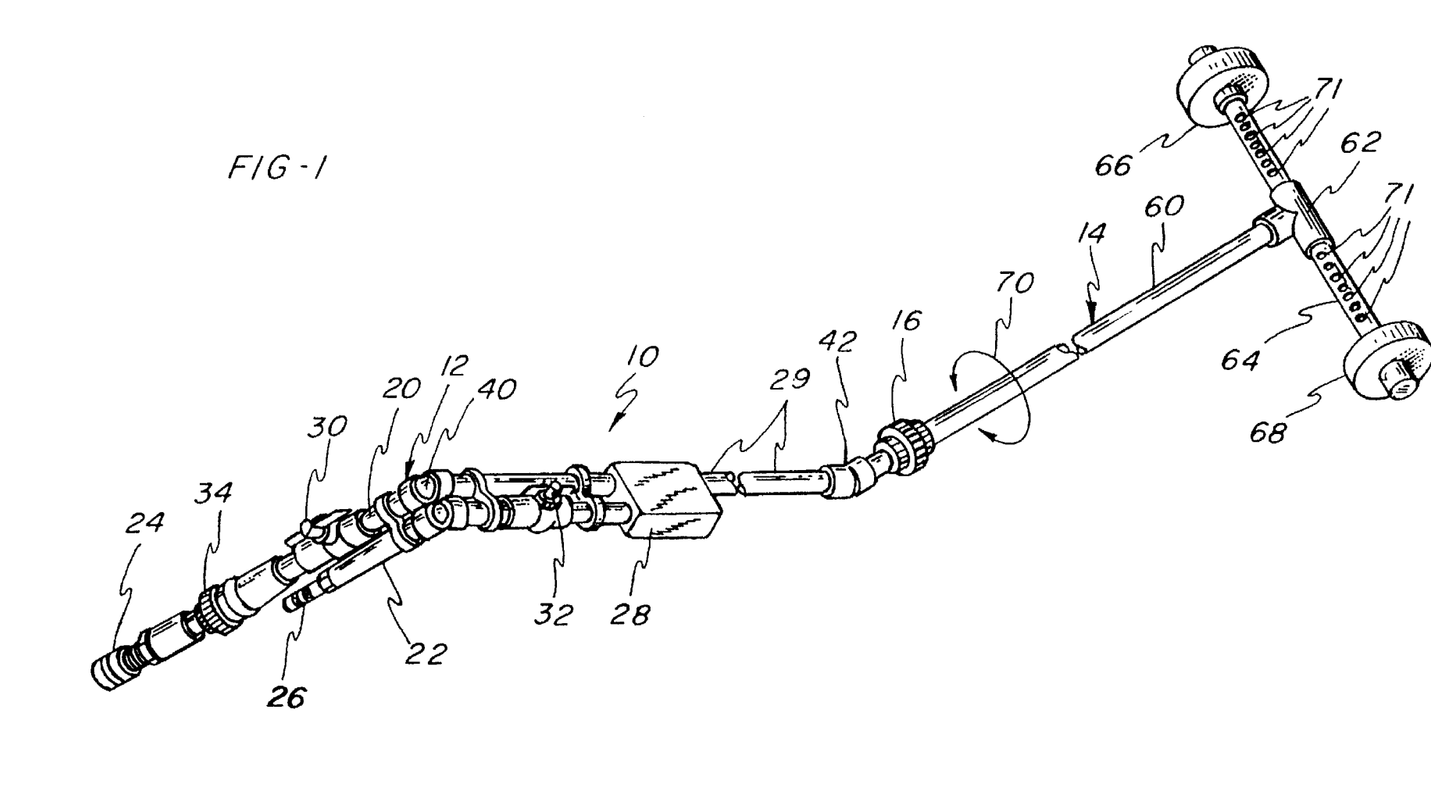
FIG. 1 is a perspective drawing of a water spray apparatus according to the present invention.

A water spray apparatus according to the present invention is generally illustrated in FIG. 1 as indicated by the reference numeral 10. The water spray apparatus comprises two principal assemblies, a water supply assembly 12 and a water spray assembly 14, joined by a union 16. This enables pivoting rotation of water spray assembly 14 as indicated by the double headed arrow 70. Preferably, commercially available PVC compressor valves and lines are used throughout water spray apparatus 10.

Water supply assembly 12 has a water line 20 and an optional air line 22 which are joined at a mixing box 28 of conventional design. Water line 20 has a coupler 24 for attachment to a garden hose or the like. Air line 22 has a coupler 26 for connection to a source of pressurized air. Mixing box 28 supplies a mixture of water and pressurized air to a transmission line 29 for transmission to water spray assembly 14. For ease of handling water supply assembly 12 has a downward bend 40 and an upward bend 42. This provides ergonomically correct positioning for the relatively diverse uses which will be described hereinafter.

Water line 20 has a water adjustment valve 30 which may be a butterfly valve of conventional design. Similarly, air line 22 has an adjustment valve 32, also of conventional design. Preferably, water line 20 is provided with a check valve 34 to prevent pressurized air from backing up into the water supply system for the apparatus. In a typical application air may be supplied to air line 22 at a pressure of about 120–150 psi. Water may be supplied to water line 20 at a somewhat lower pressure of about 40–60 psi.

Figure 2:
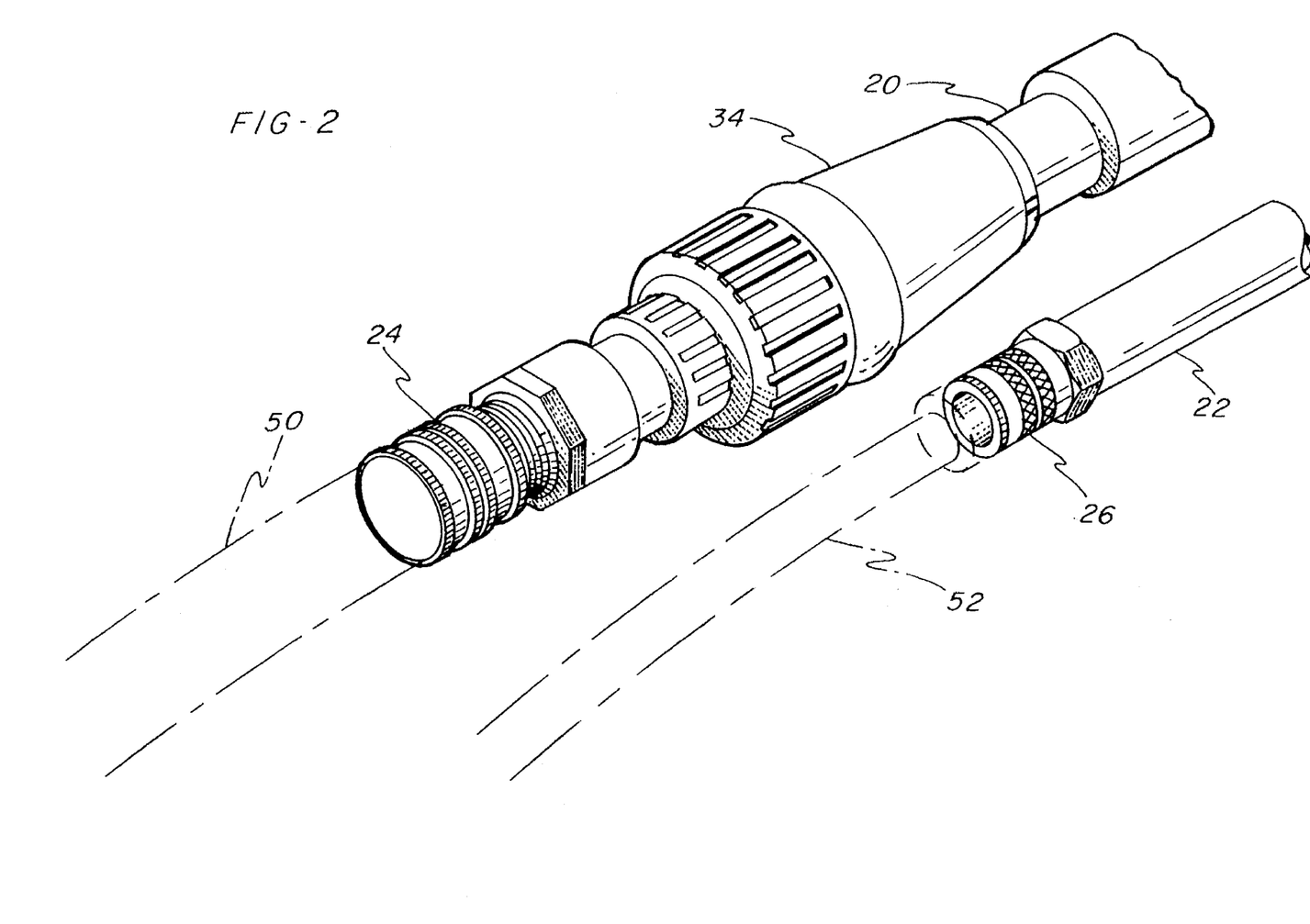
FIG. 2 is a perspective drawing of input connections for a water spray apparatus.

FIG. 2 illustrates input connections for the apparatus. A first coupler 24 connects water line 20 to a suitable supply line 50 whereas a second coupler 26 connects air line 22 to an air supply line 52. Details of check valve 34 are illustrated in FIG. 3.

Figure 3:
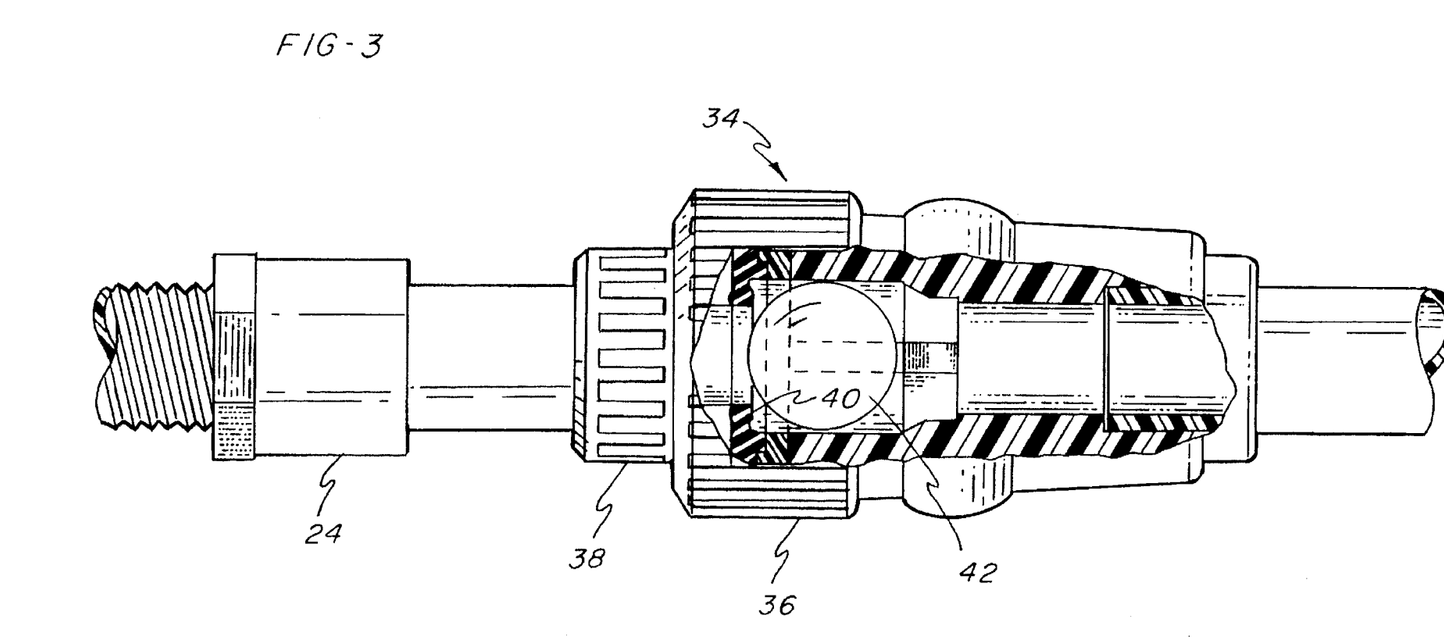
FIG. 3 is a partially cut-away view of a check valve.

Referring now to FIG. 3, check valve 34 is seen to comprise a ball 42 which becomes seated against a seat 40 in a female fitting 36 under conditions of reverse flow in line 20. Female fitting 36 is joined to a male fitting 38. A similar check valve may be provided in air line 22.

Figure 4:
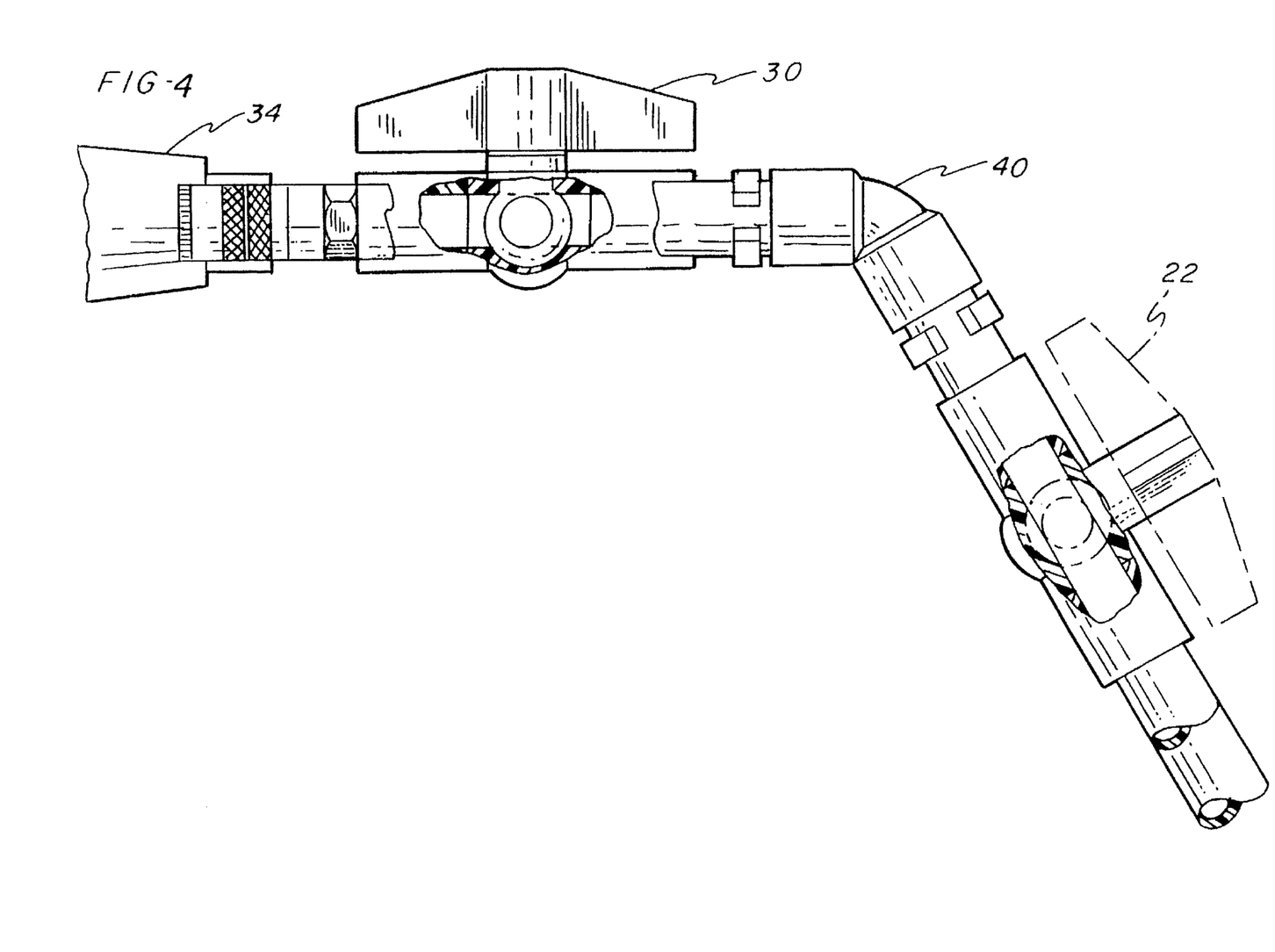
FIG. 4 is a side elevation view of a water supply assembly.

References may be made to FIG. 4 for additional details of water supply assembly 12.

Figure 5:
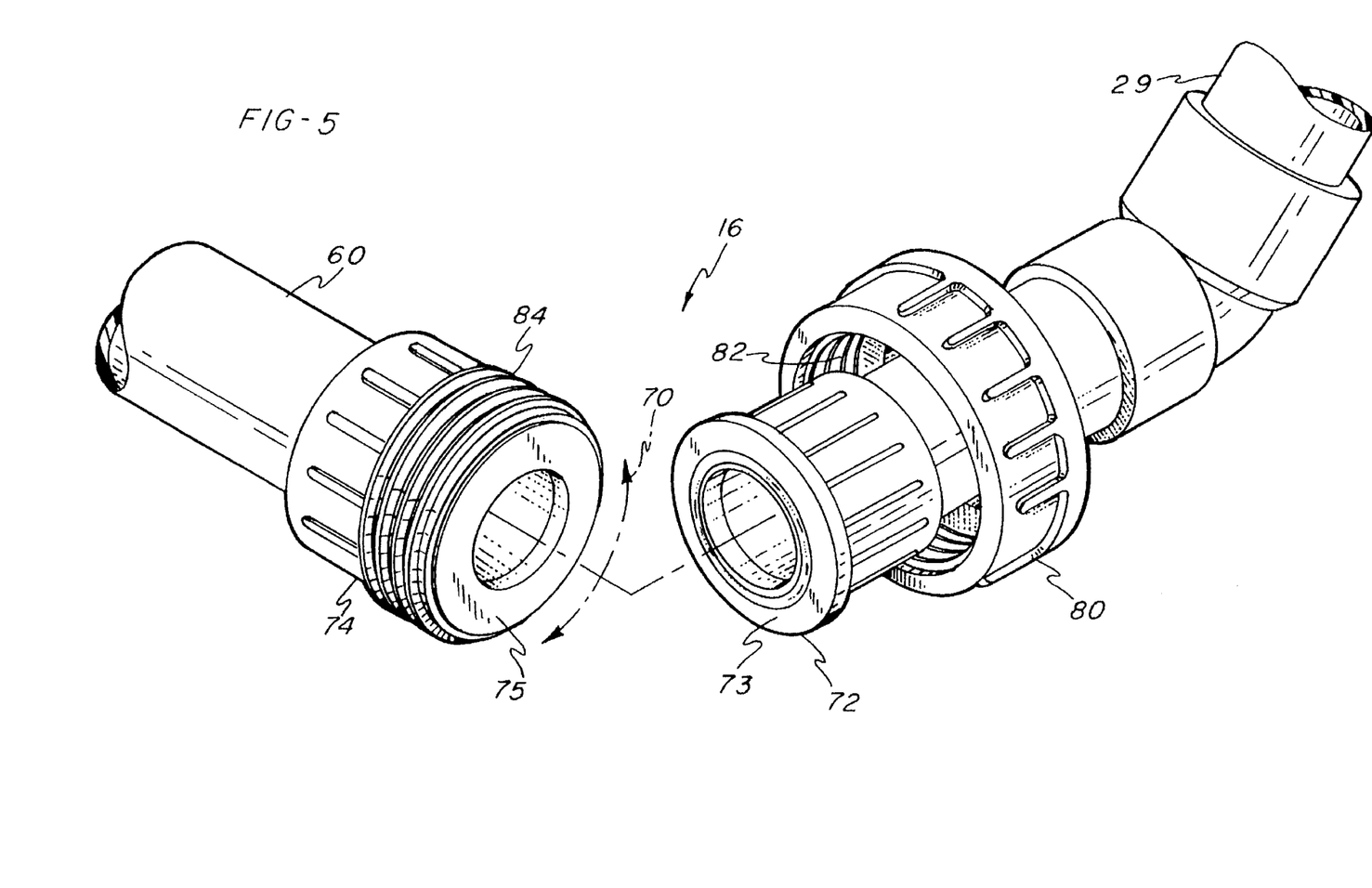
FIG. 5 is a partially exploded view of a union.

FIG. 5 illustrates construction details of union 16. Preferably the parts illustrated in FIG. 5 are commercially available PVC parts. Union 16 comprises a seat 72 having a face 73 and a probe 74 having a face 75. There is a cap 80 which fits over seat 72 forcing face 73 into contact with face 75. Interior threads 82 of cap 80 are brought into threaded engagement with threads 84 of probe 74. However prior to tightening of the threads a feed line 60 of water spray assembly 14 is rotated to the correct orientation for use as hereinafter described. Also illustrated in FIG. 5 is a transmission line 29 which receives the output from mixing box 28.

Referring again to FIG. 1, feed line 60 is seen to terminate at a TEE fitting 62 which is joined to a cross tube 64. Cross tube 64 is axially supported by a pair of wheels 66, 68. Wheels 66, 68 maintain cross tube 64 at a fixed level above the ground irrespective of the pivotal position of feed line 60. It will be appreciated that cross tube 64 is hollow and is in fluid communication with coupling 16 via feed line 60. Cross tube 64 is provided with a series of commonly facing orifices 71 for generating a series of commonly directed streams 92 (see FIGS. 6 and 7).

Figure 6:
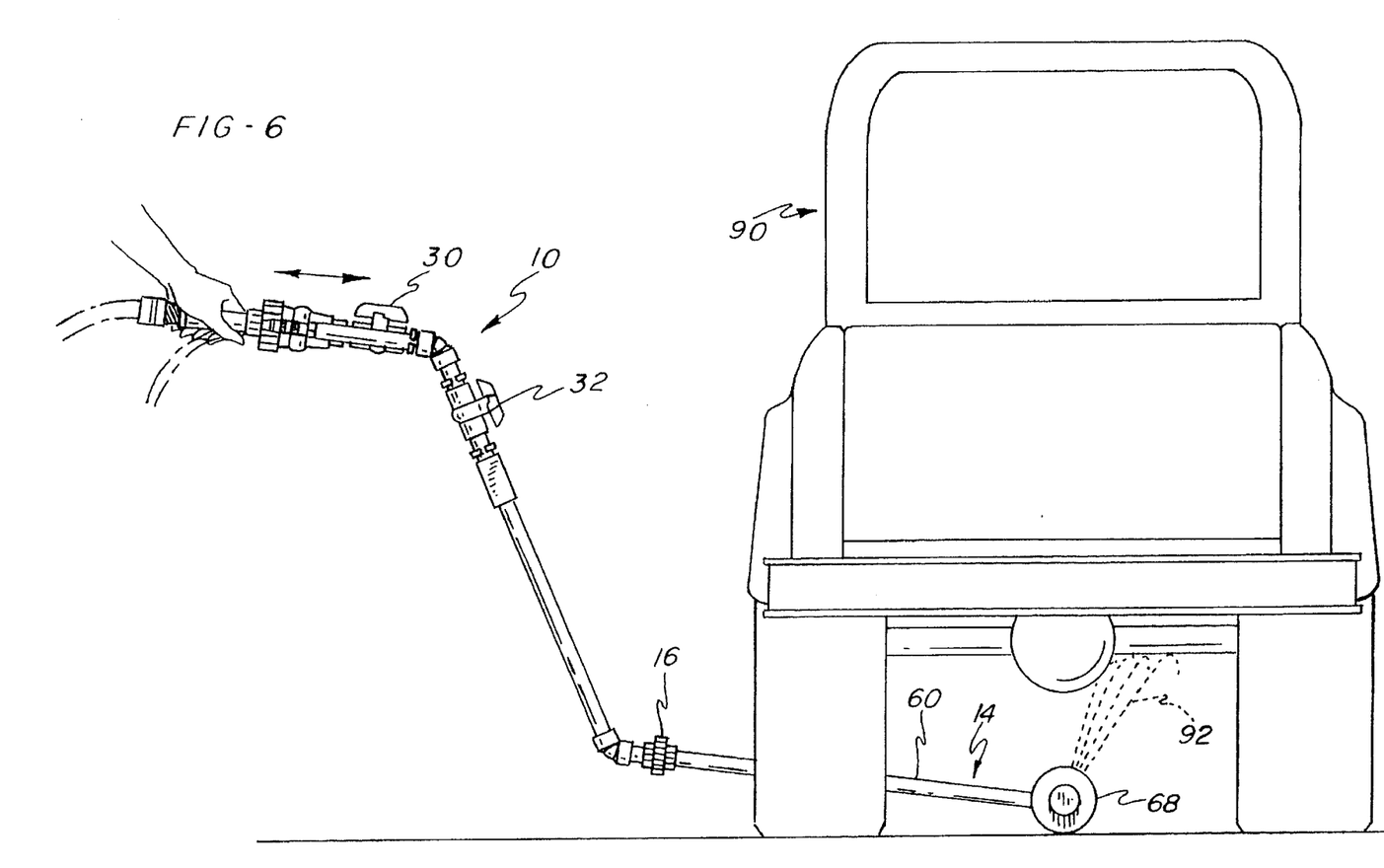
FIG. 6 is an illustration of the water spray apparatus in use for spraying a vehicle undercarriage.

Referring now to FIG. 6, water spray apparatus 10 is shown in use for cleaning a vehicle under carriage. For this purpose water spray assembly 14 is pivoted so that orifices 71 are facing upwardly, thereby directing streams 92 against the under carriage of a vehicle 90. The rolling motion of wheels 66, 68 maintains orifices 71 at the correct elevation during horizontal movement of water spray apparatus 10.

In order to convert water spray apparatus 10 for use in ground surface cleaning or sweeping, union 16 is loosened, feed line 60 is rotated or pivoted 180 degrees, and union 16 is thereafter tightened. This produces the configuration illustrated in FIG. 7. Again wheels 66, 68 maintain the correct clearance for orifices 71, so that streams 92 perform an optimum cleaning function. It will be appreciated that the diameter of wheels 66, 68, must be selected for providing the appropriate vertical positioning of orifices 71. In general the diameter should range from about 2 inches to about 4½ inches. For water pressures and air pressures commonly available in residential areas, and for washing undercarriages of common height, a wheel diameter of about 4 inches is considered optimum.

Figure 8:
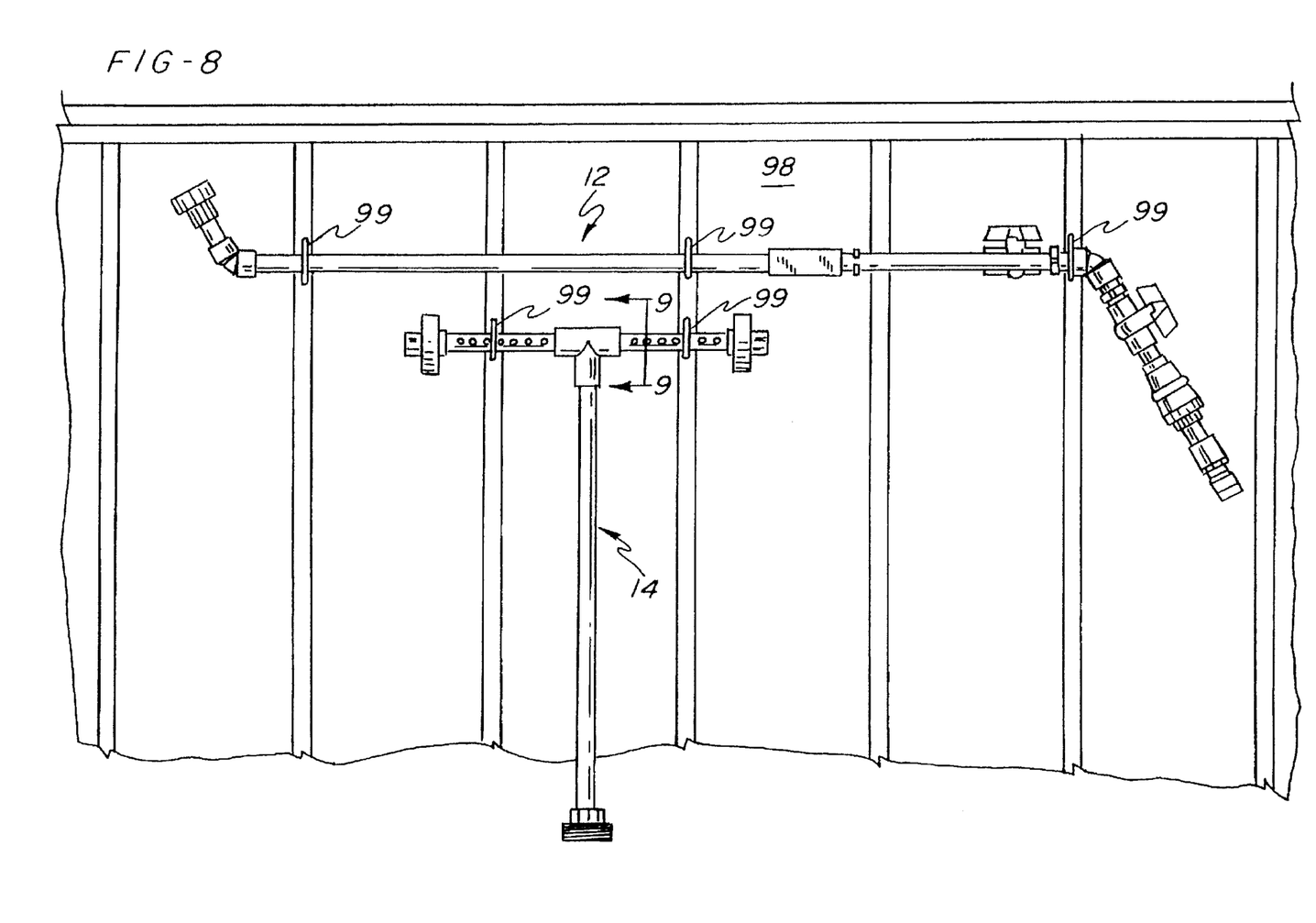
FIG. 8 illustrates the water spray apparatus broken down and stored on a vertical surface.

Storage of water spray apparatus 10 is facilitated by union 16. Vertical storage is accomplished as illustrated in FIG. 8 by separating water supply assembly 12 and water spray assembly 14 at union 16. Thereafter water supply assembly 12 and water spray assembly 14 may be mounted on a vertical surface 90 as by a series of hooks 99.

Figure 7:
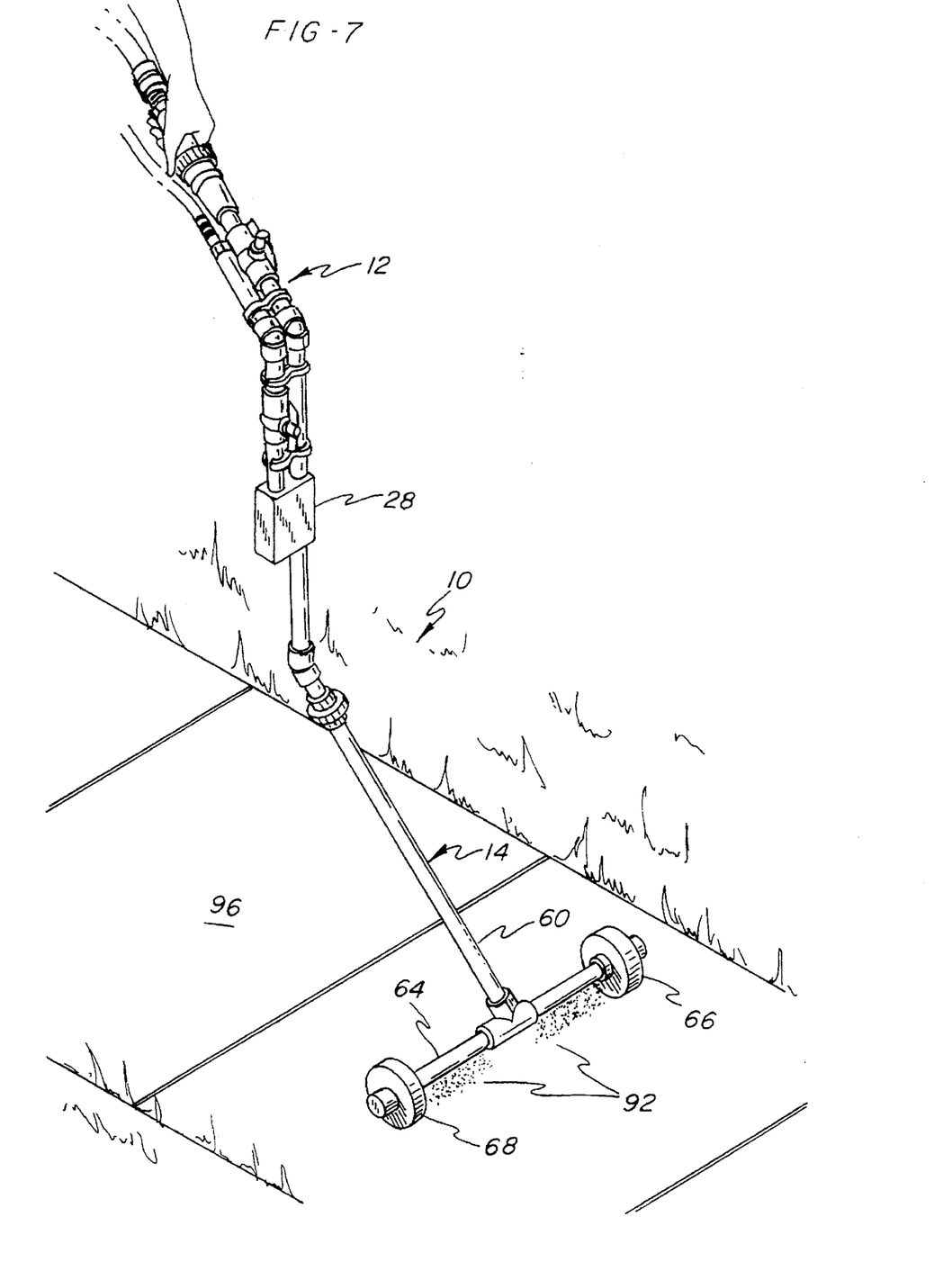
FIG. 7 is an illustration of the water spray apparatus in use for cleaning a sidewalk.
Figure 9:
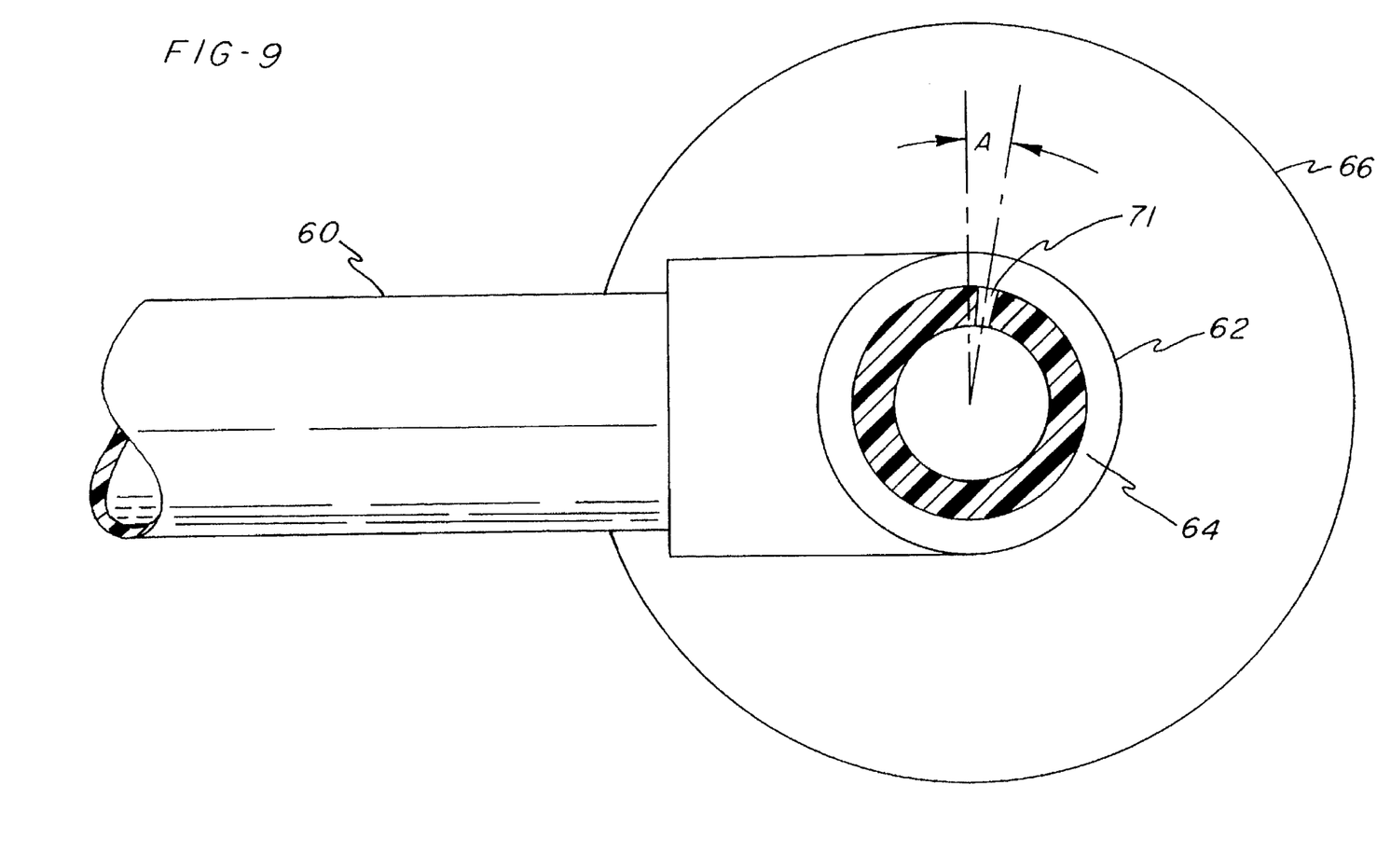
FIG. 9 is a cross-section taken along line 9—9 of FIG. 8.

FIG. 9 illustrates a preferred positioning of orifices 71. As shown therein, orifices 71 are forwardly angled by a small angle A so as to prevent backspraying toward the user. Preferably angle A is in the order of about 10 degrees. This causes water streams 92 to be directed nearly vertically downward when water spray apparatus 10 is used for sweeping and as illustrated in FIG. 7 and about 20 degrees forwardly when used for undercarriage cleaning as shown in FIG. 6.

While the form of apparatus herein described constitutes a preferred embodiment of this invention, it is to be understood that the invention is not limited to this precise form of apparatus, and that changes may be made herein without departing from the scope of the invention which is defined in the appended claims.

What is claimed is:

1. Water spray apparatus comprising:

a water supply assembly; a water spray assembly; and a union rotationally joining said water supply assembly and said water spray assembly for pivoting motion of said water spray assembly approximately 180 degrees from a first position to a second position; said water spray assembly comprising:

a hollow cross tube in fluid communication with said union and provided with a plurality of commonly facing orifices for downwardly expelling a plurality of water streams when said water spray assembly is oriented in said first position and upwardly expelling a plurality of water streams when said water spray assembly is oriented in said second position; and a pair of wheels axially supporting said cross tube and having a diameter which elevates said orifices to a height which is suitable for selectively directing said streams upward toward a vehicle undercarriage or downward toward a ground surface.

2. Water spray apparatus according to claim 1 wherein said diameter is between about 2 inches and 4.5 inches.

3. Water spray apparatus according to claim 1 wherein said water supply assembly comprises a water line, an air line, and a mixing box connected to said water line and to said air line for receiving and mixing flows of water and air carried respectively thereby and a transmission line connected for carrying a mixture of water and air from said mixing box to said union.

4. Water spray apparatus according to claim 3 wherein said water supply assembly further comprises a water line adjustment valve mounted in said water line, an air line adjustment valve mounted in said air line and a check valve mounted in said water line.

5. Water spray apparatus according to claim 1 wherein said water supply assembly is provided with an ergonomically correct combination of a downward bend followed by an upward bend.

6. Water spray apparatus according to claim 5 wherein said orifices are angled slightly forwardly to prevent backspraying.

7. Water spray apparatus according to claim 6 wherein said orifices are angled forwardly at one angle of about 10 degrees.

8. Water spray apparatus according to claim 6 wherein said water spray assembly further comprises a feed line connected to said union and a TEE fitting joining said feed line to said cross tube.

9. Water spray apparatus according to claim 6 wherein said orifices are arranged along a straight line extending substantially the full length of said cross tube.

10. Water spray apparatus according to claim 9 wherein said water supply assembly comprises a water line, an air line, and a mixing box connected to said water line and to said air line for receiving and mixing flows of water and air carried respectively thereby and a transmission line connected for carrying a mixture of water and air from said mixing box to said union.

\* \* \* \* \*